United States Patent
Pidduck et al.

(10) Patent No.: US 9,836,541 B2
(45) Date of Patent: *Dec. 5, 2017

(54) SYSTEM AND METHOD OF MANAGING CAPACITY OF SEARCH INDEX PARTITIONS

(71) Applicant: Open Text SA ULC, Halifax (CA)

(72) Inventors: Patrick Thomas Sidney Pidduck, Waterloo (CA); Aleksandra Czarlinska, San Jose, CA (US)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/539,542

(22) Filed: Nov. 12, 2014

(65) Prior Publication Data

US 2015/0074080 A1 Mar. 12, 2015

Related U.S. Application Data

(63) Continuation of application No. 13/595,031, filed on Aug. 27, 2012, now Pat. No. 8,909,615.

(Continued)

(51) Int. Cl.
*G06F 17/30* (2006.01)
*H04L 12/26* (2006.01)

(52) U.S. Cl.
CPC .. *G06F 17/30864* (2013.01); *G06F 17/30117* (2013.01); *G06F 17/30345* (2013.01);
(Continued)

(58) Field of Classification Search
CPC ......... G06F 17/30117; G06F 17/30312; G06F 17/30327; G06F 17/30339; G06F 17/30442; G06F 17/30377; G06F 17/30584

(Continued)

(56) References Cited

U.S. PATENT DOCUMENTS 6,125,370 A * 9/2000 Courter ............. G06F 17/30312
6,269,373 B1 * 7/2001 Apte ....................... G06F 9/465
(Continued)

FOREIGN PATENT DOCUMENTS

EP 0683452 A1 * 11/1995 ........... G06F 3/0601

OTHER PUBLICATIONS

Notice of Allowance issued for U.S. Appl. No. 13/595,031, dated Aug. 27, 2012, 11 pages.

*Primary Examiner* — Frantz Coby
(74) *Attorney, Agent, or Firm* — Sprinkle IP Law Group

(57) ABSTRACT

A search system can maintain a search index of metadata and text for objects in a repository, repositories or distributed across a network. The search index can be divided into partitions with a partition assigned a first capacity utilization threshold and a second capacity utilization threshold. If the capacity utilization of the partition is below the first threshold, the system can add, update and delete information in the partition. If the capacity utilization of the partition is above the first threshold, the system can update and delete information in the partition, but cannot add information for new objects to the partition. If the capacity utilization of the partition is above the second threshold, the system can enter a rebalancing mode in which it seeks to rebalance capacity utilization between partitions. The behavior of the system can change depending upon the size of a partition relative to its configurable thresholds.

24 Claims, 4 Drawing Sheets

Related U.S. Application Data

(60) Provisional application No. 61/528,967, filed on Aug. 30, 2011.

(52) U.S. Cl.
CPC .. *G06F 17/30584* (2013.01); *G06F 17/30631* (2013.01); *H04L 43/16* (2013.01)

(58) Field of Classification Search
USPC ....... 707/705, 706, 718, 696, 802, 741–746, 707/783, 812
See application file for complete search history.

(56) References Cited

U.S. PATENT DOCUMENTS

| | | | |
|---|---|---|---|
| 7,136,883 B2* | 11/2006 | Flamma | G06F 3/0601 |
| 7,146,389 B2* | 12/2006 | Ebata | G06F 3/0608 |
| 7,174,346 B1 | 2/2007 | Gharachorloo et al. | |
| 7,293,016 B1 | 11/2007 | Shakib et al. | |
| 7,809,762 B1* | 10/2010 | Parker | G06F 17/30377 |
| | | | 707/802 |
| 8,364,677 B2* | 1/2013 | Brodfuehrer | G06F 17/30339 |
| | | | 707/705 |
| 8,533,181 B2* | 9/2013 | Hu | G06F 17/30442 |
| | | | 707/718 |
| 8,732,139 B2* | 5/2014 | Schreter | G06F 17/30327 |
| | | | 707/696 |
| 8,868,526 B2* | 10/2014 | Balakrishnan | G06F 17/30631 |
| | | | 707/696 |
| 8,898,204 B1* | 11/2014 | Sathe | G06F 17/30 |
| | | | 707/812 |
| 8,909,615 B2* | 12/2014 | Pidduck | G06F 17/30117 |
| | | | 707/706 |
| 2004/0044698 A1* | 3/2004 | Ebata | G06F 3/0608 |
| 2005/0165750 A1 | 7/2005 | Shakib et al. | |
| 2006/0190243 A1* | 8/2006 | Barkai | G06F 17/30486 |
| | | | 704/8 |
| 2009/0157666 A1 | 6/2009 | Behrke et al. | |
| 2010/0306238 A1 | 12/2010 | Balakrishnan et al. | |
| 2010/0306268 A1* | 12/2010 | Bhatti | G06F 21/604 |
| | | | 707/783 |
| 2011/0225165 A1* | 9/2011 | Burstein | G06F 17/30336 |
| | | | 707/741 |
| 2012/0143873 A1* | 6/2012 | Saadat | G06F 17/30584 |
| | | | 707/741 |
| 2014/0181071 A1 | 6/2014 | Pidduck et al. | |

\* cited by examiner

| OBJECT ID | AUTHOR ID | OWNER ID | EDITOR ID | AUTHOR NAME | OWNER NAME | CREATOR NAME | EDITOR NAME | TEXT |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | |

SYSTEM AND METHOD OF MANAGING CAPACITY OF SEARCH INDEX PARTITIONS

CROSS-REFERENCE TO RELATED APPLICATIONS

This is a continuation of, and claims a benefit of priority from U.S. patent application Ser. No. 13/595,031, filed Aug. 27, 2012, entitled "SYSTEM AND METHOD OF MANAGING CAPACITY OF SEARCH INDEX PARTITIONS," which is a conversion of and claims a benefit of priority from U.S. Provisional Application No. 61/528,967, filed Aug. 30, 2011, entitled "SYSTEM AND METHOD OF MANAGING CAPACITY OF SEARCH INDEX PARTITIONS," both of which are incorporated by reference as if set forth herein in their entireties.

TECHNICAL FIELD

This disclosure relates generally to the field of computerized search systems, and more particularly to systems, methods and products for managing capacity of search index partitions in a computerized search system.

BACKGROUND OF THE RELATED ART

Document management systems often employ a search engine to allow for fast retrieval of information. A search engine can search the metadata and text of documents in a search index to determine which documents match search criteria without having to parse the document itself.

As the volume of information committed to a search system increases, a need arises to have multiple search systems sharing responsibility for managing the search index. The index needs to be split into smaller components, called partitions. Each partition has a capacity limit, based on resources such as available memory, disk space or other capacity constraints.

As partitions are filled with new data from indexing operations, they approach a point at which they are eventually deemed to be full. In a traditional system, the administrators need to monitor the sizes of the partitions, and make configuration changes as the partitions increase or decrease in size. This creates a system management burden, and can even result in a partition becoming inoperable if configuration changes are not made in a timely manner.

One solution is for the administrator of the system to check the conditions of the partitions on a regular basis. This introduces the prospect of user error, and is problematic if the administrators are not available.

Another solution is for external automated applications to regularly check the status of the partitions, and notify the administrators that action should be taken based upon configuration rules. The disadvantages here are the need for external programs to be created to monitor the partitions, and this still leaves room for errors if the administrator cannot react to the notifications in a timely manner.

If the search system provides suitable integration points, it may also be possible for an external system to monitor the status of partitions and make configuration changes automatically. This places a burden on external technology to anticipate the internal behavior of search partitions.

None of these solutions, however, provide for an understanding when a partition is too full and moving appropriate data from a full partition to one with available space.

There are implementations that exist today which are capable of moving data to other partitions. However, these solutions move data inefficiently, have only one mode of operation, and only move data once extreme limits have been exceeded. Consequently, there is always room for innovations and improvements.

SUMMARY OF THE DISCLOSURE

This disclosure relates generally to the field of computerized search systems. More particularly, embodiments disclosed herein provide for a system, method and computer program product that can manage search index partitions in a computerized search system in an automated, efficient, and intelligent manner.

A computerized search system may comprise a search engine. This search engine may maintain a search index for objects (e.g., documents or other objects in a repository). This search index may be partitioned, each having a set capacity. In one embodiment, when a capacity utilization of a partition in the search index is under a first threshold, the search engine may allow objects to be added to the partition and also allow existing objects in the partition to be updated or deleted. An update operation may, for example, be to replace or modify the object.

When the capacity utilization of the partition meets or exceeds the first threshold, the search engine may change from an Add mode to an Update mode. In the Update mode, the search engine may refuse indexing requests to add objects to the partition, but still allow existing objects in the partition to be updated or deleted.

When the capacity utilization of the partition meets or exceeds a second threshold, the search engine may change from the Update mode to a Rebalancing mode. In the Rebalancing mode, the search engine may refuse indexing requests to add objects to the partition, allow existing objects in the partition to be deleted, and move objects, for which indexing requests have been received to update them, to other partition(s) that are not yet full. To do so, a partition manager may transform an object that is subject to an update into an indexing request. The indexing request thus generated is then sent to another partition in the search index for processing. Optionally, the partition manager may automatically and proactively move existing objects out of the partition that is in the Rebalancing mode without waiting for incoming indexing requests to modify or delete existing objects. The partition manager may be configured to perform such a moving operation until the capacity utilization of the partition drops below a third threshold and back into the Update mode. These thresholds are configurable and may differ from partition to partition.

One embodiment provides a computer program product that comprises a non-transitory computer readable medium having a set of computer instructions stored on it. The instructions are executable by a computer processor to perform a method essentially as described above.

Another embodiment provides a computerized search system comprising at least one non-transitory computer readable medium storing instructions translatable by at least one processor to perform a method essentially as described above.

Embodiments disclosed herein can provide many advantages. For example, by having a range of capacity utilization reserved for updates to a partition, an authorized user can estimate the space that will be needed for updates and therefore eliminate or reduce the amount of rebalancing that will be required when the partition is full. Further, having an Update mode with a Rebalancing mode also provide advantages. With these modes, the rebalancing process can be optimized and the partition manager can make better decisions about allocating indexing requests among partitions.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Document management systems often employ a search engine to allow for fast retrieval of information. A search engine can search the metadata and text of documents in a search index to determine which documents match search criteria without having to parse the document itself. Embodiments of a search engine described herein provide systems and methods for managing partitions to prevent partitions from becoming unmanageable. It may be helpful to first discuss an example search system.

Figure 1:
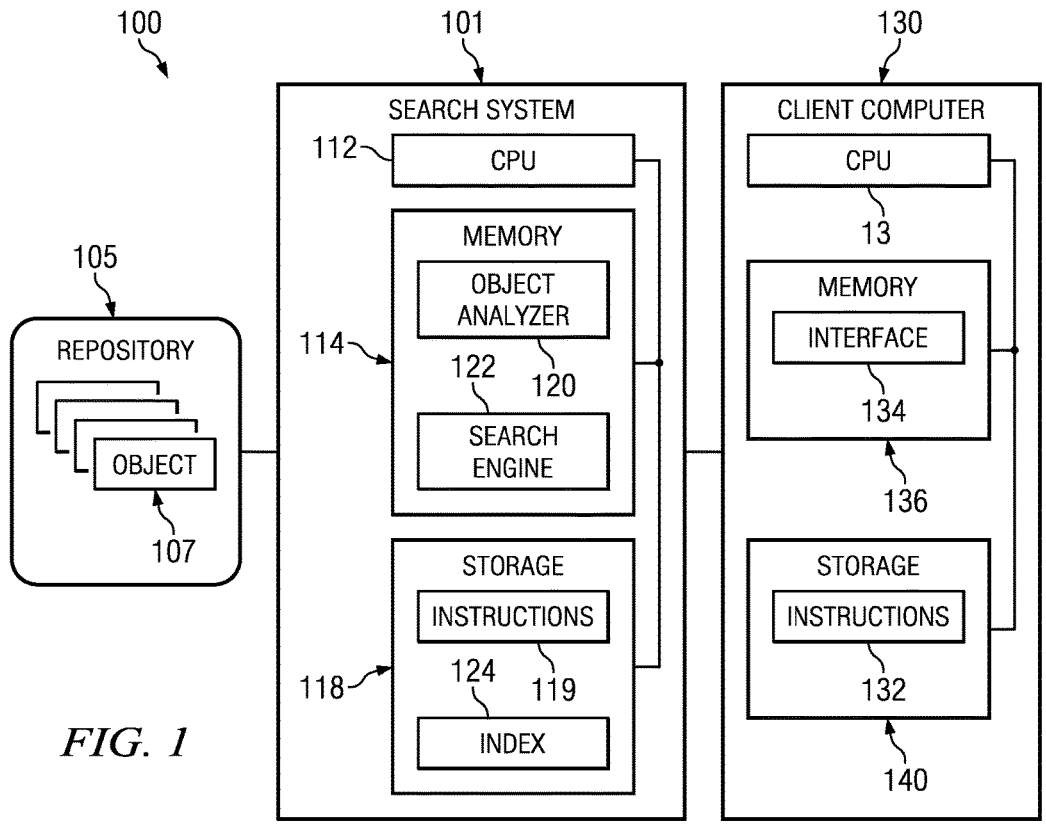
FIG. 1 depicts one embodiment of a computing environment in which one embodiment of a search system can be implemented.

FIG. 1 depicts a block diagram illustrating one embodiment of a computing environment 100 with object search system 101. Computing environment 100 includes an object repository 105 storing objects 107 of interest (documents, images, emails or other objects that may be searched). Object repository 105 may comprise a file server or database system or other storage mechanism remotely or locally accessible by search system 101.

In the embodiment of FIG. 1, search system 101 comprises a server having a central processing unit 112 connected to a memory 114 and storage unit 118 via a bus. Central processing unit 112 may represent a single processor, multiple processors, a processor(s) with multiple processing cores and the like. Storage unit 118 may include a non-transitory storage medium such as hard-disk drives, flash memory devices, optical media and the like. Search system 101 may be connected to a data communications network (not shown).

Storage unit 118 stores computer executable instructions 119 and index 124. Computer executable instructions 119 can represent multiple programs and operating system code. In one embodiment, instructions 119 are executable to provide an object analyzer 120 and search engine 122. Object analyzer 120 and search engine 122 may be portions of the same program or may be separate programs. According to one embodiment, for example, object analyzer 120 is a component of a document management system while search engine 122 is a separate program that interfaces with the document management system. Furthermore, object analyzer 120 and search engine 122 can be implemented on different computing systems and can, themselves, be distributed.

Index 124 includes metadata used to identify objects in response to a search query and may also include text used to identify objects. Index 124 can include a single index containing metadata and text, separate metadata and text indices or other arrangements of information. While shown as a single index, index 124 may include multiple indices. Further, as will be described further below, index 124 may be partitioned, with different objects being represented in each partition.

Client computer system 130 may include components similar to those of the server of search system 101, such as CPU 138, memory 136, and storage 140. Additionally, client computer system 130 may include executable instructions 132 to provide a user interface 134 that allows a user to enter a search query. The user interface may be provided through a web browser, file system interface or other program.

The search system 101 of FIG. 1 is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system). Similarly, client computer 130 may include any suitable desktop computer, laptop, mobile device, server or other computing system.

In operation, object analyzer 120 analyzes objects in object repository 105 to determine information to be indexed in index 124. Object analyzer 120 can send indexing instructions to search engine 122 to direct search engine 122 to add/modify/or delete metadata or text in index 124, as discussed below. When a search query is received, search engine 122 can search the information in index 124 to identify objects responsive to the search query and return a list or other representation of those objects to client computer 130.

Figures 2, 4:
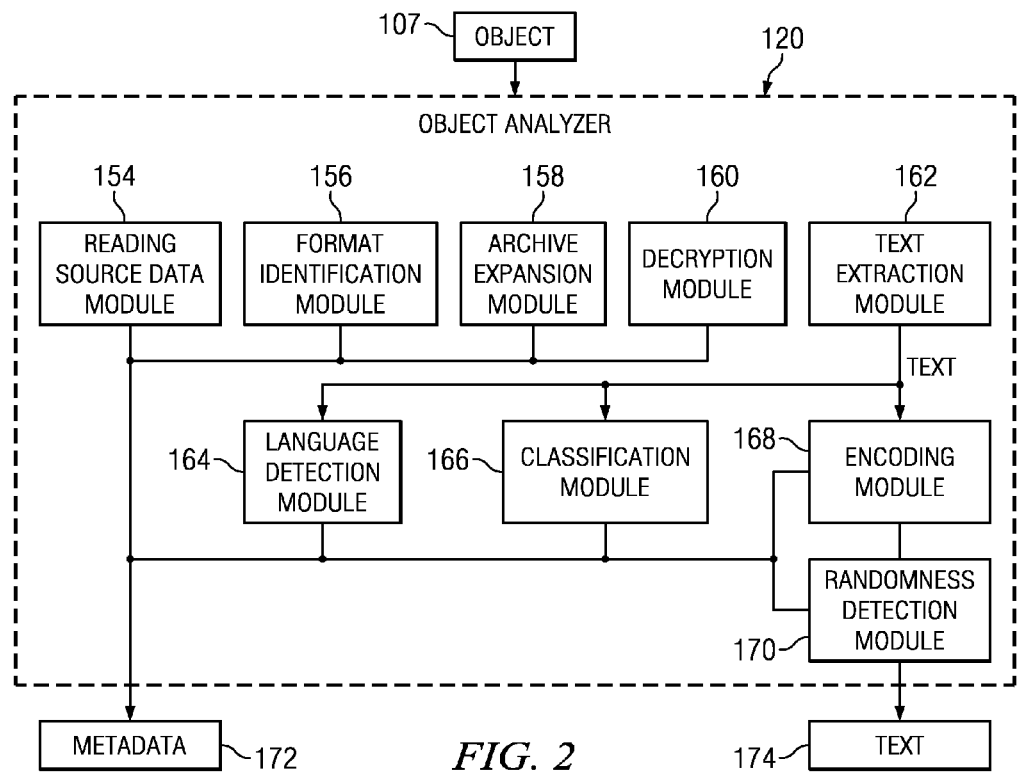
FIG. 2 depicts a functional block diagram illustrating one embodiment of an object analyzer.
FIG. 4 depicts a diagrammatic representation of one embodiment of regions or fields for a portion of an index.

FIG. 2 depicts a diagrammatic representation of one embodiment of an object analyzer 120 for analyzing an object 107. Object analyzer 120 can comprise various modules to process an object 107. Reading source data module 154 can open the object 107. Format identification module 156 examines the object to determine what type of file or data the object 107 comprises. Archive expansion module 158 unzips files or otherwise decompresses files if the object 107 is a compressed file. Decryption module 160 decrypts all or part of the data in the object 107. Text extraction module 162 applies rules to text in the object 107 to extract text for index 124. Language detection module 164 examines the text to determine the language in which the text is written. Classification module 166 applies rules based upon text and metadata to classify content. Encoding module 168 can convert text to a supported encoding. Randomness detection module 170 can analyze data to be indexed to reject random information.

Object analyzer 120 may include modules that can derive metadata for object 107. For example, a document management system may provide a limited amount of metadata with the object 107. Object analyzer 120 can derive other metadata from the metadata provided, text or other properties of the object 107. As a specific example, a filter or piece or code that extracts the text from a PowerPoint presentation might also create metadata about the presentation. In this example, the metadata which is not provided by the document management system and which is derived by object analyzer 120 may include the number of slides in the presentation, the title of the file, the name of the presentation author, or the size of paper the presentation was designed to print on. More complex examples of derived metadata might include statistical analysis to generate a list of keyword or key concepts in the document; determining the subject person or company of the text; sentiment analysis—is the tone of the text positive or negative; or language identification—in what language is the text written. Further examples of metadata that may either be provided by the document management system (or other application) or derived by the analyzer may be the date the object was created, the size of the object in bytes, the name of the object, a description of the object or the like.

The embodiment of FIG. 2 is provided by way of example. Object analyzer 120 may include any number of other modules to analyze an object and extract text 174 and metadata 172 to be indexed. Object analyzer 120 may be a portion of a larger program, such as a document management program, may be a separate program or may be implemented according any suitable programming architecture. In one embodiment, the process of determining metadata 172 and text 174 to be indexed may be carried out by any number of different programs on a computer system or distributed across computer systems.

Metadata 172 and text 174 thus processed by object analyzer 120 may be provided to a search engine. An example search engine will now be described with reference to FIG. 3.

Figure 3:
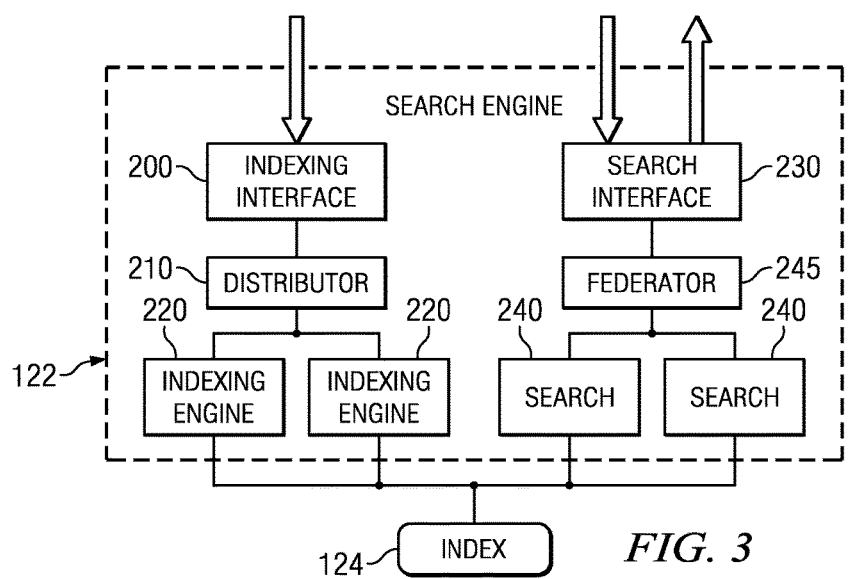
FIG. 3 depicts a functional block diagram illustrating one embodiment of a search engine.

FIG. 3 depicts a diagrammatic representation of logical blocks for one embodiment of a search engine 122. Search engine 122 may provide an indexing interface 200 that receives indexing requests (e.g., from object analyzer 120) or other source. A distributor module 210 may distribute the indexing requests to indexing engine 220 that act on an indexing request to update index 124. Search engine 122 may also include a search interface 230 to receive queries (e.g., from a document management system or other source). Search interface 230 may send queries to search modules 240. Federator 245 gathers the results from all search modules together, and generates a response to the query received through search interface 230. Search modules 240 are responsible for performing searches on an index partition, and performing tasks such as computing relevance score, sorting results, and retrieving metadata regions to return in a query.

Search interface 230 may be configured to receive a search query from a user, and search index 124 for objects that meet the criteria set forth in the search query. Query language may also be configured to permit sorting results of a search. Various rules may be used to determine the sort order. In this example, a user constructed the search query. It should be noted, however, that the user could be any system that issues queries to the search system, and may include other computer programs searching on behalf of other users, creating reports or running automatic processes. Additionally, as described above, there can be many different types of metadata in the search index. Thus, the search queries are not restricted to "text" based search terms.

In the context of this disclosure, the phrase "search term" represents a technical concept or interpretation. For example, a search term in the context of this disclosure can be a word, a string, or any combination of the following:

phrases
numbers
strings
logical operations (e.g., AND, OR, NOT, etc.)
ordering or operations (e.g., using parenthesis)
relationships (e.g., greater than, less than, not equal to, etc.)
similarities based on thesaurus, stemming, sounds-like, etc.
wildcards and pattern matching To this end, a search term can also refer to any term that is used in a query and that has been modified or generated by any commonly used techniques.

For context, a search term could be a word "john" or a more complex expression like: (>"bob" or !=("123" or a*)) and (sounds-like "smith" or thesaurus "doctor" or "medical doctor" or stem "medical").

The embodiment of FIG. 3 is provided by way of example. Search engine 122 may include any number of other modules or configurations to update and search an index. For example, search modules 240 and indexing engines 220 may be a single module. Search engine 122 may be a portion of a larger program, such as a document management program, may be a separate program or may be implemented according to any suitable programming architecture. In one embodiment, the processes of search engine 122 may be distributed across multiple computer systems. Furthermore, while in FIG. 3, index 124 is illustrated as a single index, index 124 may comprise a set of smaller indexes. For example, a separate index can be used by each indexing engine.

FIG. 4 depicts a diagrammatic representation of one embodiment of regions or fields for a portion of index 124. Index 124 includes a list of some or all objects 107 in repository 105 (FIG. 1), each identified by a unique identifier 301 (also referred to as object ID). Index 124 further includes a set of metadata regions 300 (also referred to as metadata fields). A metadata field 300 may include more than one entry for an object. The metadata fields can each have associated values in value storage locations within storage unit 118. In other embodiments, the values may be discarded. The index may include a list of dictionary terms contained in the metadata values of the object and pointers to where the metadata values corresponding to the field are stored. Index 124 may also include other regions for an object, such as a text region 302. Text region 302 may, for example, include a list of terms in the text of an object. Index 124 may include some or all of the content of an object.

While shown as a single index, index 124 may be partitioned. In index partitioning, in one embodiment, the index of objects in repository 105 may be split into multiple indexes such that some objects are listed in one index partition, while other objects are listed in the other index partitions. As described below with reference to FIGS. 5 and 6, a 'partition' comprises a portion or fragment of index 124 and is associated with indexing engine 220 and search module 240. Note it is possible to copy a partition and associate a different index engine and search engine with this partition. Index partitioning may also reduce resource usage and search time. Furthermore, separate indexes may be maintained for metadata and text and/or different metadata regions or fields. Index 124 can be stored according to any suitable storage scheme. Example storage schemes may include "Memory Storage," "Disk Storage" and "Retrieval Storage":

Memory Storage: in this storage scheme, all the elements of the index are kept in memory. This provides the fastest operation when search results must be retrieved, since the memory storage mode minimizes disk activity. Conversely, memory storage consumes the most memory in partitions. Text regions which are frequently searched and retrieved for display should typically be held in memory.

Disk Storage: in this storage scheme, the dictionary and index are kept in memory, but the value storage is located on disk within a Checkpoint file. Keyword searches are still fast, but search queries which need to examine the original data, such as phrase searches, are generally slower. Retrieving values from disk for display is also slower. For regions which are not commonly searched and displayed, disk storage is a good choice. Disk storage is also suitable as a storage mode for systems utilizing solid state hardware.

Retrieval Storage: in this storage scheme, storage is optimized for text metadata regions which need to be retrieved and displayed, but do not need to be searchable. As an example, text values may be stored on disk within the Checkpoint file, and there is no dictionary or index at all. This storage scheme can be used, for example, for regions such as Hot Phrases and Summaries.

Figure 5:
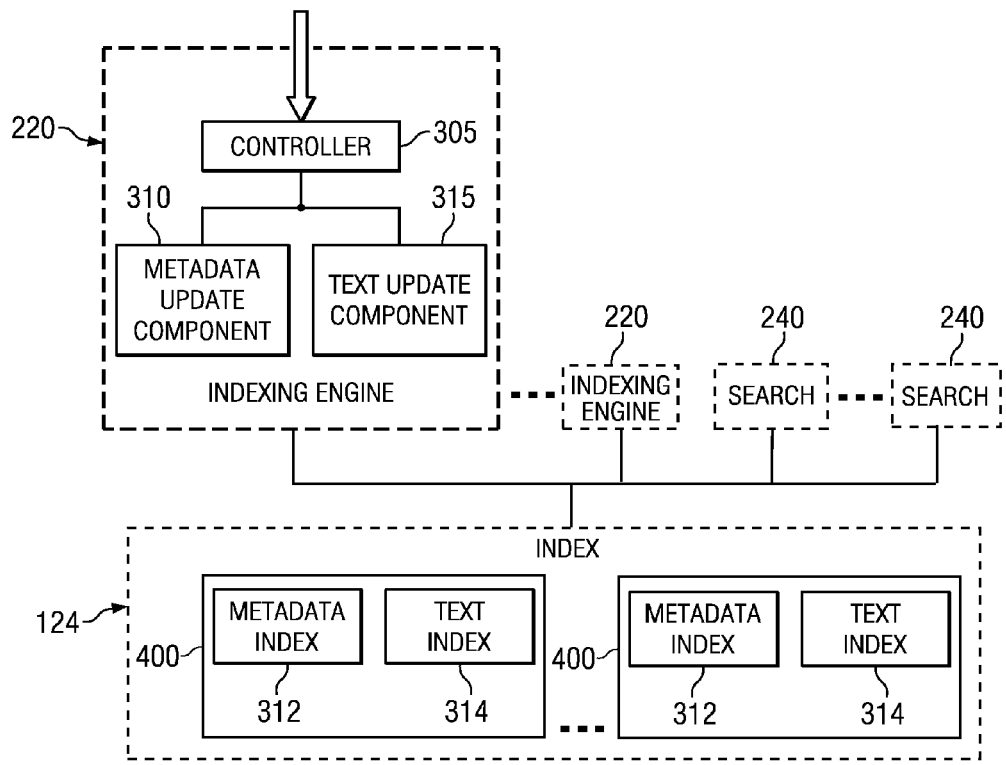
FIG. 5 depicts a functional block diagram illustrating one embodiment of an indexing engine.

FIG. 5 depicts a diagrammatic representation of one embodiment of an indexing engine 220 to maintain a partition of index 124. In this embodiment, indexing engine 220 can include an indexing controller 305, a metadata update component 310, and a text update component 315. In this embodiment, index 124 is maintained as a separate metadata index 312, which contains metadata for objects in repository 105, and text index 314, which contains content text from objects in repository 105, with a known relationship between the text and metadata components for each object in the index.

Indexing controller 305 receives indexing requests (e.g., from a distributor, another application or other source). An indexing request received at the indexing controller 305 may include an instruction to add an object, delete an object, modify an object or replace an object in index 124. Such an indexing request may also include the information to be added or changed, such as the full text content to be indexed and the associated metadata for the object. An indexing request may also contain derived metadata.

The text (derived text or full text content) of an indexing request may be a text file. It could be data exported from a database or other information system. Commonly, the text is the human-readable information within a document composed on a computer. In this scenario, a file such as a Microsoft Word document would be analyzed by a filtering step to extract the text, which can be stripped of unnecessary information such as fonts, styles, or page layout information.

The metadata portion of an indexing request may specifically be provided by an application providing the indexing request. This might be data such as an identifier for the object, the date or time it was first added to the system, or the identity of the user who manages the object.

A portion of the metadata can be derived metadata. Derived metadata can include metadata inferred from the text content. For example, the filter or code that extracts the text from a PowerPoint presentation might also create metadata about the presentation. In this example, the generated metadata may include the number of slides in the presentation, the title of the file, the name of the presentation author stored in the PowerPoint file, or the size of paper the presentation was designed to print on. More complex examples of derived metadata might include statistical analysis to generate a list of keyword or key concepts in the document, determining the subject person or company of the text, sentiment analysis (the positive or negative tone of the text), or identification of the language in which the text is written. Derived metadata may also include data inferred from processing an object. For example, in processing a PowerPoint presentation, derived metadata may include a timestamp of the time the PowerPoint was processed or the location where the PowerPoint presentation was processed.

An indexing engine can receive an indexing request 510 from an application, distributor or other source. Indexing request 510 specifies an operation to be taken on index 124 for an object and any metadata or text for that action. For context, an application that generates an indexing request may be a corporate document management system, a web site with a search capability such as an online store, or a desktop search program for email.

According to one embodiment, for example, an indexing request can take the form of an indexing object that includes a unique identification for an object, an operation, the metadata or text regions affected and the metadata and/or text for the index. By way of example, but not limitation, indexing operations may include adding, replacing, modifying and deleting information in the index, or combinations thereof. The following provides some exemplary operations that may be included in indexing requests.

AddOrReplace: this operation can be used to create new objects in the index. According to one embodiment, if the object does not exist, it will be created, but if an entry with the same object identification exists, then it will be completely replaced with the new data, equivalent to a delete and add.

AddOrReplace: this function may distinguish between content and metadata. If an object already exists, and metadata only is provided, the existing full text content is retained.

AddOrModify: this operation will update an existing object, or create a new object if it does not already exist. When modifying an existing object, only the provided content and metadata is updated. Any metadata regions that already exist which are not specified in the AddOrModify command will be left intact.

Delete: this operation will remove an object from the index, including both the metadata and the content.

Indexing controller 305, according to one embodiment, is a component which interprets the indexing request to determine how it should be processed. Indexing controller 305 can identify whether a text indexing command exists, and, if so, send the command with the necessary parameters to the text update component 315. Indexing controller 305 can likewise determine if any metadata indexing operations are required, and if so, send the command with necessary parameters to the metadata update component 310.

Text update component 315 is responsible for processing requests to index full text content. This may include tasks such as maintaining a dictionary of search terms, maintaining the internal search data structures, and updating the storage representation of the text portion of the search index in memory or on disk as appropriate. Text update component 315 may support instructions such as Add an Object, Replace an Object, or Delete an Object.

Metadata update component 310 is responsible for processing requests to index metadata 312 associated with an object in index 124. This may include building and maintaining dictionaries of search terms, maintaining internal search data structures, and updating the representation of the metadata portion of the search index in memory or on disk as appropriate. Metadata update component 310 may support instructions such as Add an Object, Replace an Object, or Delete an Object.

The embodiment of FIG. 5 is provided by way of example. Indexing engine 220 may include any number of other modules to update and search an index. Indexing engine 220 may be a portion of a larger program, such as a document management program, may be a separate program or may be implemented according any suitable programming architecture. In one embodiment, the processes of indexing engine 220 may be distributed across multiple computer systems.

Figure 6:
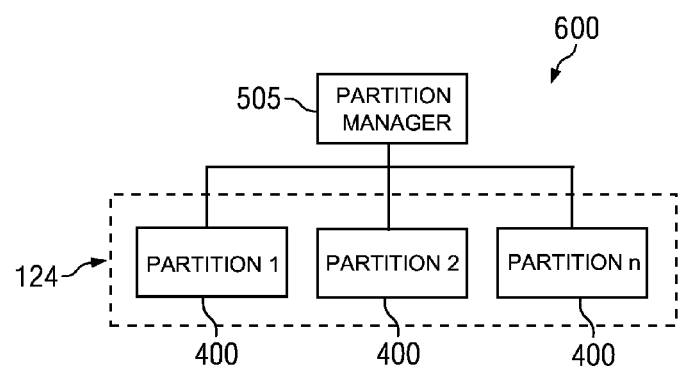
FIG. 6 depicts a diagrammatic representation of one embodiment of an index with multiple partitions connected to and being managed by a partition manager.

As discussed above, an index may be partitioned. FIG. 6 depicts a diagrammatic representation of one embodiment of system 600 for managing partitions. In the embodiment of FIG. 6, index 124 is divided into "n" partitions 400, with each partition including a metadata index and a text index. As illustrated in FIG. 5, in one embodiment, each partition can have its own indexing engine 220 and search module 240.

A partition manager can be configured to manage these partitions. Partition manager 505 is a component of a search system that accepts indexing requests, and determines which partition should service an indexing request, and provides the indexing request to the appropriate indexing engine 220. In one embodiment, partition manager 505 can be a logical function of a search engine in the search system which, in turn, can be part of a document management system. In one embodiment, partition manager 505 can be a logical function of distributor 210 shown in FIG. 3. An indexing engine (e.g., indexing engine 220 shown in FIG. 3) for a partition performs the actual indexing operations of adding, deleting or modifying data in the partition. Likewise, partition manager 505 may be able to federate search queries to multiple search engines 240 associated with multiple partitions and combine the results. In one embodiment, this function of partition manager 505 may be incorporated in a federator (e.g., federator 245 shown in FIG. 3).

Figures 7, 8:
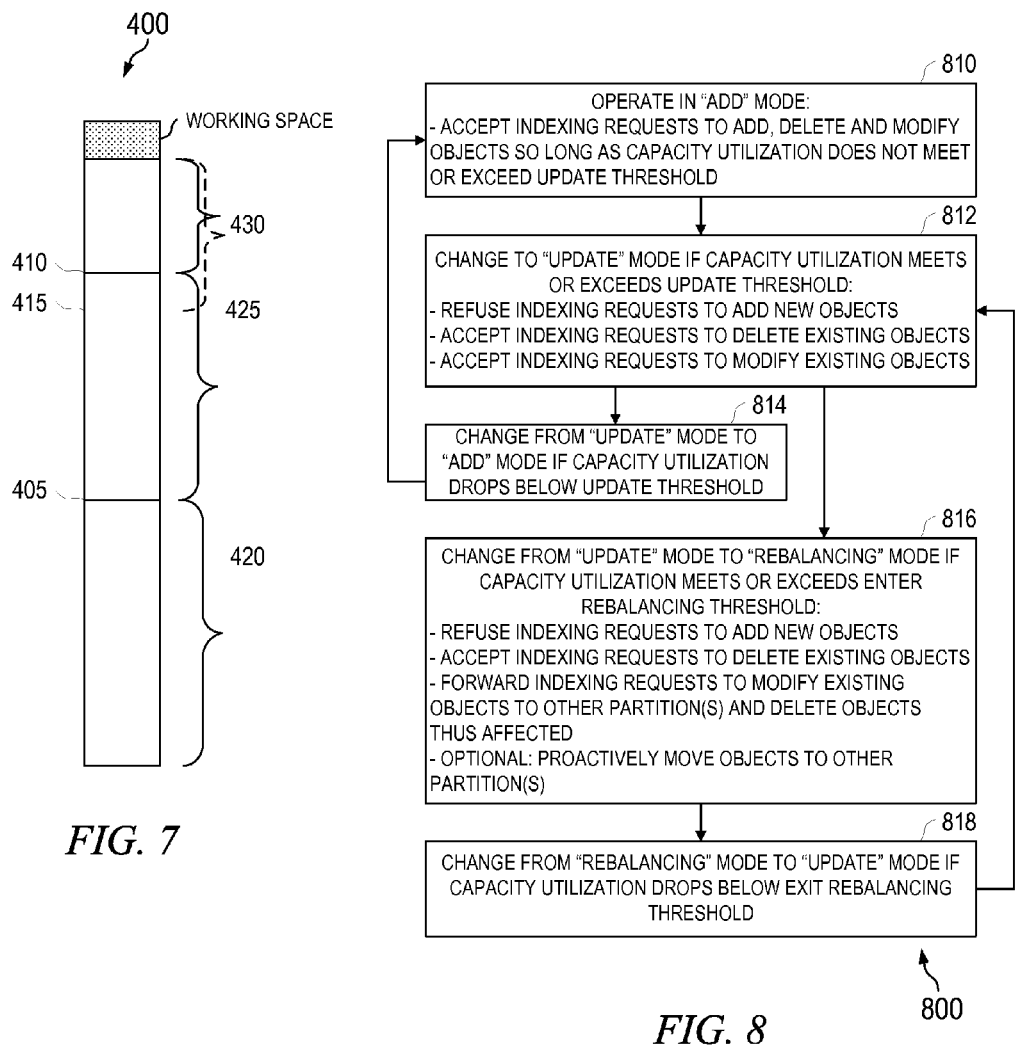
FIG. 7 depicts a diagrammatic representation of one embodiment of a partition to which multiple thresholds are assigned.
FIG. 8 depicts a flow diagram illustrating one embodiment of a method for managing an index partition.

A search system can be configured so that each partition can have a set capacity (number of objects, memory, disk space or other measure of capacity). Additionally, thresholds can be set for each partition. The amount of information in the partition relative to the thresholds can be used to determine which operations are performed on the partition. An example of this methodology is described below with reference to FIGS. 7-8. FIG. 7 depicts one embodiment of partition 400 to which three thresholds are assigned: first threshold 405, second threshold 410 and third threshold 415. As flow 800 of FIG. 8 illustrates, the behavior of the search system can change depending upon the amount of information in a partition relative to various thresholds. These thresholds may be the same or different from partition to partition. Each partition 400 in index 124 can have its own set of thresholds.

Assume there are several partitions, and the initial state is that each is empty. For the purpose of discussion and not of limitation, the capacity of the partition is described below using percentages. In practice, the capacity utilization of a partition may be measured using one or a combination of values, such as memory, disk space, the number of objects contained within a partition, or other suitable measures.

In the empty state, the partition is capable of accepting new objects. That is, the indexing engine is able to accept new objects to the partition. The partition therefore is operating in an "Add" mode, which is represented in FIG. 7 as range 420. The indexing engine is also capable of servicing indexing requests to delete or modify objects already within the partition. Thus, the capacity utilization of partition 400 may increase or decrease as operations are performed to add objects to the partition, delete objects from the partition, or modify objects in the partition. The partition can continue to accept new objects while in the "Add" mode until the capacity utilization reaches first threshold 405. In the example of FIG. 8, this is referred to as "Add" mode (810).

Once the Update Threshold is exceeded and the partition is in capacity utilization range 425, indexing engine 220 will change its mode of operation from "Add" to "Update" (812). In the Update mode, the indexing engine for the partition will refuse to accept indexing requests to add new objects. Specifically, indexing engine 220 will communicate with partition manager 505 to convey this status and partition manager 505 will direct any indexing requests to add objects to other partitions.

While in the Update mode the indexing engine can continue to accept requests to delete existing objects, which will reduce the capacity utilization. The indexing engine will also accept requests to change or modify existing objects, which may increase or decrease the capacity utilization depending upon the nature of the change. If the capacity utilization of the partition drops below the Update Threshold, the partition will change its behavior back to the Add mode (814), and can begin accepting new objects again (810). Referring to FIG. 7, when the amount of information in the partition decreases from capacity utilization range 425 to capacity utilization range 420 (below first threshold 405), may cause indexing engine 220 as well as distributor 210 to change behavior. Specifically, indexing engine 220 will change its mode of operation from "Update" to "Add" and distributor 210 (where partition manager 505 resides in this example) will again direct indexing requests to add objects to partition 400.

While the capacity utilization of the partition is in the Update mode, as indexing requests to modify objects are processed, the capacity utilization may increase. Eventually, the capacity utilization may reach an Enter Rebalancing Threshold, which is referred to as second threshold 410 in FIG. 7. At this point, the partition is now over the safe capacity for adding new objects or modifying existing objects. The partition enters a "Rebalancing" mode of operation (816) and into capacity utilization range 430. As shown in FIG. 7, capacity utilization range 430 is defined by third threshold 415, which is normally lower than second threshold 410. Third threshold 415 may be referred to as an Exit Rebalancing Threshold. Once in the Rebalancing mode, the partition will remain in the Rebalancing mode until the capacity utilization drops below the Exit Rebalancing Threshold. Thus, once partition 400 enters into capacity utilization range 430, indexing engine 220 will remain in the Rebalancing mode until the capacity utilization drops below third threshold 415. In this embodiment, the fact that the capacity utilization may drop below second threshold 410 but not third threshold 415 will not cause indexing engine 220 to change from the Rebalancing mode to the Update mode. In another embodiment, when the capacity utilization drops below second threshold 410, indexing engine 220 will change from the Rebalancing mode to the Update mode. In this embodiment, third threshold 415 is not needed and second threshold 410 can server as a single trigger point by which indexing engine 220 enters or exits the Rebalancing mode. In one embodiment, having third threshold 415 being lower than second threshold 410 may provide better efficiency, as described below.

While in the Rebalancing mode, the partition will not accept new objects to index. In one embodiment, if an indexing request arrives to modify an existing object in the partition, partition manager 505 may extract the object to be modified and transform it to an indexing request for another partition. In this case, partition manager 505 can select which target partition should be used and forward the indexing request that partition manager 505 had prepared to an appropriate indexing engine 220. Partition manager 505 may then cause the object to be deleted from the partition that is in the Rebalancing mode. In this way, the capacity utilization can be reduced any time an object is deleted from the partition, or an object is modified since modification causes the object to be moved from the partition that is in the Rebalancing mode to another partition that is not in the Rebalancing mode.

In one embodiment, partition manager 505 can wait for delete and modify operations to reduce the capacity utilization while a partition is in the Rebalancing mode. An alternative implementation would allow a more aggressive Rebalancing operation in which objects are moved proactively to other partitions to reduce the capacity utilization below the Rebalancing Threshold, instead of waiting for indexing requests to delete and/or modify specific objects. When the capacity utilization drops below the Exit Rebalancing Threshold, the system will switch the mode of operation from the Rebalancing mode to the Update mode for the partition (818).

In any application that incorporates a search system such as a document management system, having the ability to reserve a capacity utilization range for updates is a material advantage. Without an Update mode, the partitions will add information until they are full. Once full, the system must perform rebalancing every time an object must be modified in a way that increases the capacity utilization. This can impose significant performance degradation on the indexing system, since moving objects to other partitions may be computationally expensive. By having a range of capacity utilization reserved for updates, an authorized user such as a system operator or administrator can estimate the space that will be needed for updates and therefore eliminate or reduce the amount of rebalancing that will be required.

Having an Update mode with a Rebalancing mode also provide advantages. Without these modes, objects are moved each time an upper limit is reached. This can result in thrashing of the index. For example, an object is added and that pushes the size past the upper limit. The next modification moves an object to another partition, allowing another add operation to occur, with the cycle repeating. By introducing hysteresis with the Rebalancing mode, the rebalancing process can be optimized and the partition manager can make better decisions about allocating indexing requests among partitions.

According to one embodiment, thresholds 405, 410 and 415 are adjustable. This ability to configure the thresholds allows system users to optimize the behavior of the capacity management system for their situation. For example, if the search system is part of a long-term archival product, then changes to objects are infrequent, and the estimated capacity reserved for updates can be small. If the search system is part of a customer management system where customer information is changed frequently, then reserving more capacity for updates to objects is appropriate. Moreover, the number of thresholds and level of capacity of utilization of each threshold can vary between partitions.

Furthermore, partitions may be assigned additional thresholds. For example, while the same threshold is used to enter and exit the update mode of operation in FIG. 7, the partition can be assigned a different enter update threshold and exit update threshold.

Partition manager 505 can create new partitions as needed. By way of example, but not of limitation, partition manager 505 can create a new partition when all the other partitions are in an update or rebalancing mode.

In one embodiment, thresholds 405, 410 and 415 can be percentage thresholds. For example, a threshold of 85% capacity utilization may be used for the Update threshold. In this case, a majority of available memory is dedicated to building and updating the index. When the capacity utilization meets or exceeds the 85% threshold, the index is deemed to be full. The system enters into the Update mode and new objects are added to other partitions that are not full. Capacity utilization range 425, which is defined by the Update Threshold and the Enter Rebalancing Threshold, essentially represents space reserved for updates and changes to existing objects after the index partition is deemed "full". Some considerations for adjusting this threshold setting may include:

If the system has applications or custom modules known to add significant new metadata to existing objects, more space should be allowed for updates.

Archival systems which rarely modify metadata can reduce the space reserved for updates.

A threshold of 100% capacity utilization may be used to mark an entry point for the Rebalancing mode. Note that there can be memory reserved beyond the 100% capacity utilization threshold for program use and other temporary data needs. As an example, there can be 300 MB reserved working space in the memory that is not part of the capacity utilization for the partition. In this case, the 100% capacity utilization threshold can serve as an Enter Rebalancing Threshold and a 97% capacity utilization threshold can serve as an Exit Rebalancing Threshold. The index partition enters the Rebalancing mode when the Enter Rebalancing Threshold is met or exceeded. As described above, further updates in the Rebalancing mode will cause objects to be moved to other partitions. When the size of the partition in the Rebalancing mode drops below the Exit Rebalancing Threshold, the partition will again accept updates to existing object as the partition re-enters into the Update mode.

Users or an automated system can periodically review the percent full status of partitions, and adjust the partition percent full thresholds based upon actual usage patterns. Again, the capacity utilization of a partition can be measured in various ways and is not limited by the use of percentage.

Thus, embodiments of a search system can maintain a search index of metadata and text for objects in a repository, repositories or distributed across a network. The search index can be divided into partitions with a partition assigned a first capacity utilization threshold and a second capacity utilization threshold. If the capacity utilization of the partition is below the first threshold, the search system can add, update and delete information in the partition. If the capacity utilization of the partition is above the first threshold, the search system can update and delete information in the partition, but cannot add information for new objects to the partition. If the capacity utilization of the partition is above the second threshold, the search system can enter a rebalancing mode in which it seeks to rebalance capacity utilization between partitions. Other alternative embodiments are also possible.

The invention disclosed here describes a system where the partition maintenance is not visible or otherwise transparent to the end user. Specifically, a user query issued during any stage of partition maintenance is answered using a consistent and complete view of all objects in the repository regardless of the current partition in which a given object resides. The intelligent partition management described above can therefore occur 'online' or 'live'. In this context, 'online' or 'live' means that there is no interruption in the search service from the end user's perspective. This is an advantage over 'offline' systems where the search service(s) must be temporarily disabled (taken offline) to allow maintenance of the partitions. In such an 'offline' system, a user may not be able to issue queries during maintenance as such queries would produce incomplete search results.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD- ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A search system, comprising:
a computer processor;
a storage unit coupled to the computer processor;
an indexing engine executing on the computer processor; and
a search index coupled to the indexing engine,
the indexing engine configured for acting on indexing requests to update the search index,
the search index stored in the storage unit coupled to the computer processor,
the search index comprising a plurality of search index partitions,
each search index partition having a capacity utilization and characterized by an update capacity threshold and a rebalance capacity threshold,
wherein, as a result of the indexing engine acting on the indexing requests, the capacity utilization of the each search index partition changes and causes the indexing engine to change behavior,
the change in behavior of the indexing engine comprising the indexing engine changing its mode of operation depending upon what state the each search index partition is in,
wherein:
in a first state of a source partition of the plurality of search index partitions in the search index when the capacity utilization of the source partition does not exceed the update capacity threshold of the source partition, the indexing engine is able to update or delete an object in the source partition; and
in a second state of the source partition of the plurality of search index partitions in the search index when the capacity utilization of the source partition meets at least the rebalance capacity threshold of the source partition, the indexing engine is able to delete an object in the source partition or move an object in the source partition that is subject to an update to a target partition of the plurality of search index partitions in the search index.

2. The search system of claim 1, wherein the rebalance capacity threshold is greater than the update capacity threshold.

3. The search system of claim 1, wherein in the first state of the source partition, the indexing engine disallows an object not in the source partition to be added to the source partition.

4. The search system of claim 1, wherein in the second state of the source partition, the indexing engine disallows an object not in the source partition to be added to the source partition.

5. The search system of claim 1, wherein each partition is further characterized by an add capacity threshold, wherein in a third state of the source partition, the indexing engine allows an object not in the source partition to be added to the source partition when the capacity utilization of the source partition does not exceed the add capacity threshold.

6. The search system of claim 5, wherein the target partition in the search index to which the object in the source partition that is subject to the update is moved to is in a first state in which the indexing engine allows objects not in the target partition to be added to the target partition.

7. The search system of claim 1, wherein the rebalance capacity threshold includes an enter rebalance capacity threshold and an exit rebalance capacity threshold, the enter rebalance capacity threshold greater than the exit rebalance capacity threshold.

8. The search system of claim 7, wherein the state of the source partition transitions from the first state to the second state when the capacity utilization of the source partition reaches the enter rebalance capacity threshold.

9. The search system of claim 7, wherein the state of the source partition transitions from the second state to the first state when the utilization capacity reaches the exit rebalance capacity threshold.

10. The search system of claim 1, wherein the search index comprises metadata for documents in a repository and text for documents in the repository, further comprising:
a search engine coupled to the search index and configured to search for documents in the repository based on the metadata and/or the text in the search index.

11. The search system of claim 1, wherein the indexing engine is configured to receive indexing requests to add, modify, or delete objects in the search index.

12. The search system of claim 11, further comprising:
an index controller, wherein the search index comprises metadata for documents in a repository and text for documents in the repository, the index controller configured to determine whether an indexing request is associated with metadata, text, or a combination thereof.

13. A method, comprising:
responsive to indexing requests, updating a search index,
the updating performed by an indexing engine at a computer having a processor, a storage unit coupled to the processor, the indexing engine executing on the processor, and a search index coupled to the indexing engine,
the search index stored in the storage unit coupled to the processor and comprising a plurality of search index partitions,
each search index partition having a capacity utilization and characterized by an update capacity threshold and a rebalance capacity threshold,
wherein, as a result of the indexing engine acting on the indexing requests, the capacity utilization of the each search index partition changes and causes the indexing engine to change behavior,
the change in behavior of the indexing engine comprising:
the indexing engine changing its mode of operation depending upon what state the each search index partition is in,
wherein:
in a first state of a source partition of the plurality of search index partitions in the search index when the capacity utilization of the source partition does not exceed the update capacity threshold of the source partition, the indexing engine is able to update or delete an object in the source partition; and
in a second state of the source partition of the plurality of search index partitions in the search index, the indexing engine is able to delete an object in the source partition or move an object in the source partition that is subject to an update to a target partition of the plurality of search index partitions in the search index.

14. The method according to claim 13, wherein the rebalance capacity threshold is greater than the update capacity threshold.

15. The method according to claim 13, wherein in the first state of the source partition, the indexing engine disallows an object not in the source partition to be added to the source partition.

16. The method according to claim 13, wherein in the second state of the source partition, the indexing engine disallows an object not in the source partition to be added to the source partition.

17. The method according to claim 13, wherein each partition is further characterized by an add capacity threshold, wherein in a third state of the source partition, the indexing engine allows an object not in the source partition to be added to the source partition when the capacity utilization of the source partition does not exceed the add capacity threshold.

18. The method according to claim 17, wherein the target partition in the search index to which the object in the source partition that is subject to the update is moved to is in a first state in which the indexing engine allows objects not in the target partition to be added to the target partition.

19. The method according to claim 13, wherein the rebalance capacity threshold includes an enter rebalance capacity threshold and an exit rebalance capacity threshold, the enter rebalance capacity threshold greater than the exit rebalance capacity threshold.

20. The method according to claim 19, wherein the state of the source partition transitions from the first state to the second state when the capacity utilization of the source partition reaches the enter rebalance capacity threshold.

21. The method according to claim 19, wherein the state of the source partition transitions from the second state to the first state when the utilization capacity reaches the exit rebalance capacity threshold.

22. The method according to claim 13, wherein the search index comprises metadata for documents in a repository and text for documents in the repository, further comprising:
 a search engine coupled to the search index and configured to search for documents in the repository based on the metadata and/or the text in the search index.

23. The method according to claim 13, wherein the indexing engine is configured to receive indexing requests to add, modify, or delete objects in the search index.

24. The method according to claim 23, wherein the search index comprises metadata for documents in a repository and text for documents in the repository, further comprising determining whether an indexing request is associated with metadata, text, or a combination thereof.

* * * * *